Feb. 25, 1958 R. G. AMES 2,824,443
CORNER-FINISHING TOOL HEAD FOR APPLYING MASTIC
Filed Dec. 20, 1954 2 Sheets-Sheet 1
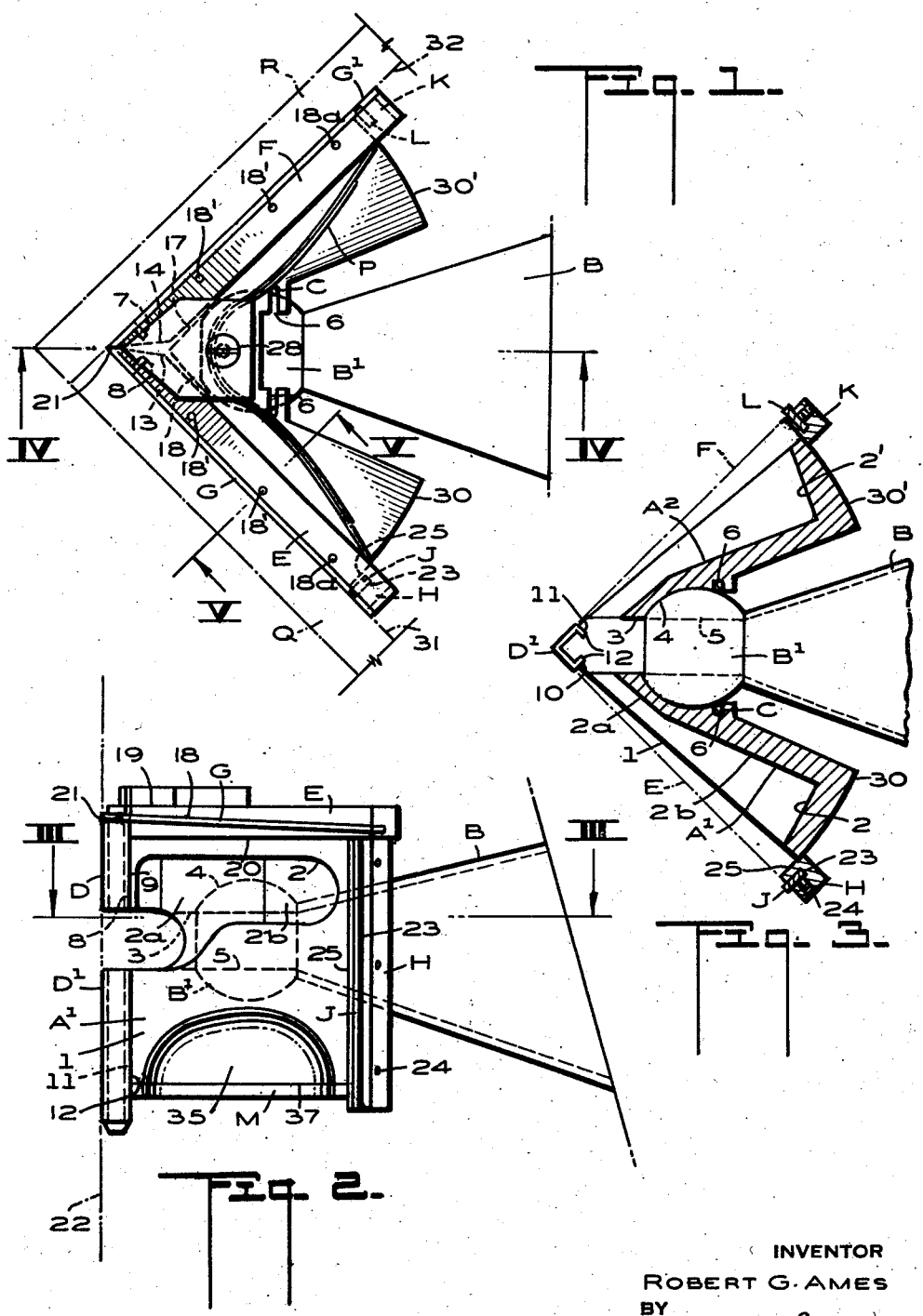
INVENTOR
ROBERT G. AMES
BY
Munn & Liddy
ATTORNEYS

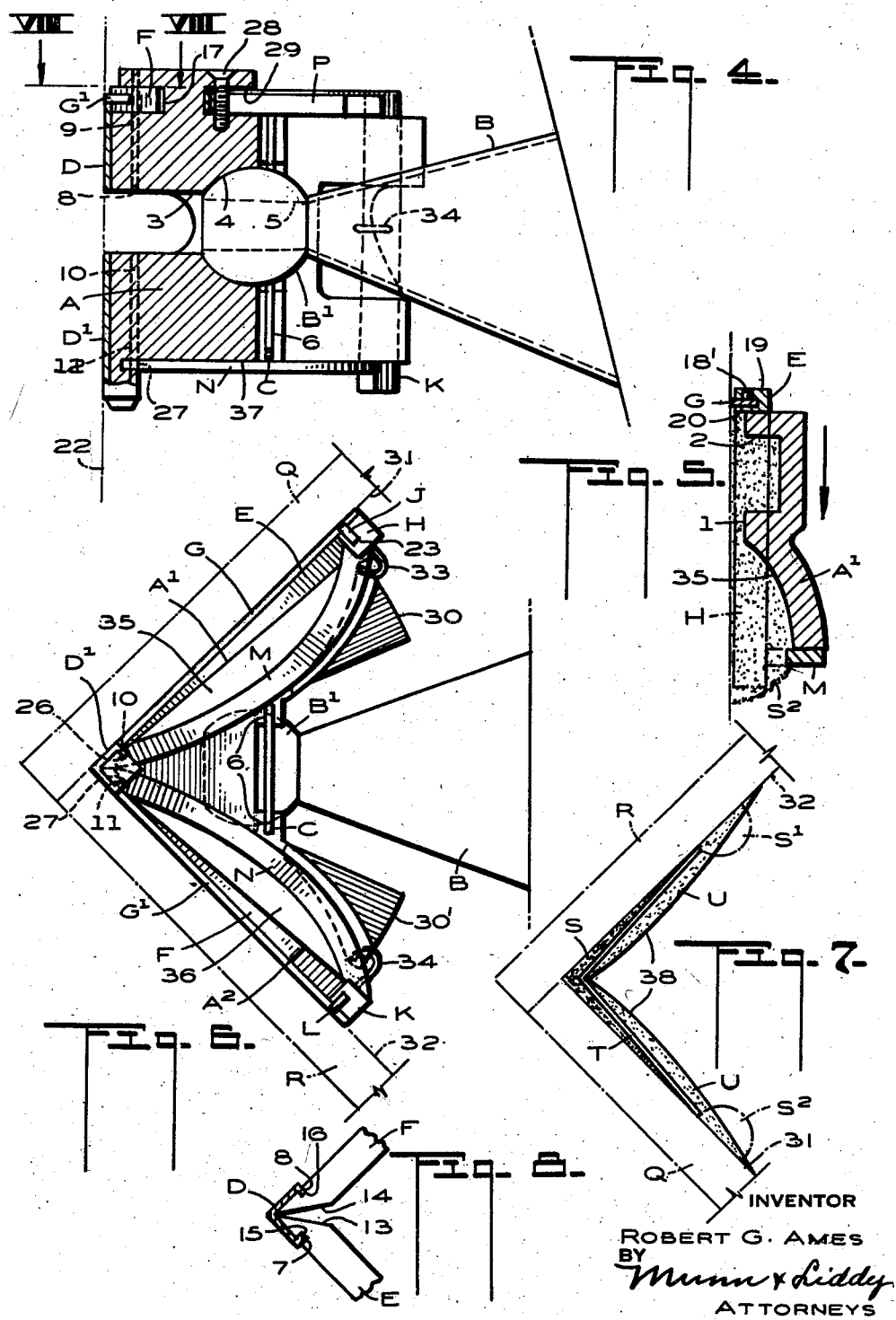

2,824,443

CORNER-FINISHING TOOL HEAD FOR APPLYING MASTIC

Robert G. Ames, San Mateo, Calif., assignor of one-half to George W. Williams, Redwood City, and one-fourth to Stanley Ames, Belmont, Calif.

Application December 20, 1954, Serial No. 476,493

6 Claims. (Cl. 72—130)

In my copending application on a mastic applicator and corner-finishing tool, Serial No. 476,219, filed December 20, 1954, I show the present corner-finishing tool head in combination with a mastic-feeding compartment of a certain design, and a handle rigidly secured to a mastic-presser plate that is swingably mounted in the compartment. Claims are drawn to the combination in that case.

In the present case, the corner-finishing tool head will be described in detail and claimed. An inside corner-finishing tool head is shown in my Patent No. 2,300,398, issued November 3, 1942, on a pressure plastic applicator. The device shown in that patent comprises a body having two outer surfaces arranged at right angles to each other and these surfaces have a transversely extending slot that is larger at its center and tapers down to a point at each of its ends. Mastic is forced out from the slot and a nozzle with a spherical head is removably and universally mounted in the body for feeding mastic to the slot. A pump is used to feed the mastic under pressure to the tool head.

The present invention is designed so that mastic can be fed manually to the corner-finishing tool head rather than by a pump. Also the tool head is designed to pick up any excess mastic that has been squeezed out from under the tape during the use of the finishing tool for corner tape, disclosed in my Patent No. 2,533,209, issued December 12, 1950.

It might be well at this time to mention that it is customary to tape the inner corner where two wallboard sections meet each other and form an angle of substantially 90°. A layer of mastic is first applied to the wallboard surfaces and then the tape is applied over the mastic after which a second layer of mastic is applied to cover the tape. In my Patents No. 2,323,963 issued July 13, 1943; and No. 2,502,499, issued April 4, 1950, on combined mastic and tape applicators, I show devices which will apply the first layer of mastic and tape to the inner corner joint in a single operation. After the layer of mastic and tape have been applied, the tape is smoothed out and any excess mastic is squeezed out by the corner roller patented device, Patent No. 2,533,209. The mastic forced out from the edges of the tape by using this tool will usually remain clinging to the wallboard surfaces. It is this excess mastic that the present corner tool head picks up and applies as a second or top layer of mastic to cover the tape and have its sides feathered so as to merge into the wallboard surfaces.

A pressure plastic applicator is shown in my Patent No. 2,413,684, issued January 7, 1947, and a modified form of this patent discloses a corner tool having hinged sides or wings for applying the second layer of mastic. The mastic is fed under pump pressure to each wing and is then applied onto the tape as the tool is moved thereover. The hinged side wings in turn are connected to the operation handle by links which have a universal connection with the wings. The present corner tool head is more stable because the single piece body portion has surfaces that extend at right angles to each other and fit the room corner. The tool has hinged trailing bars that will provide the proper crown effect to the second layer of mastic that the tool applies to the tape. Another patent of mine on a corner-finishing tool, No. 2,420,062, issued May 6, 1947, also shows hinged wings, and a leaf spring is used for urging these wings against the wallboard surfaces forming the inner corner. This tool picks up any excess mastic on the wall surface that has been squeezed out from under the tape and redeposits it on top of the tape.

The present corner-finishing tool head is an improvement over the mastic-applying and corner-finishing tool disclosed in my Patent No. 2,594,606, issued April 29, 1952. The patent illustrates a single piece body having surfaces that extend substantially at right angles to each other. A handle has a universal connection with the tool head and mastic, under pump pressure, is delivered through the universal connection to grooves formed in the two right angle extending surfaces of the tool body. The mastic passes from the grooves and onto the tape and adjacent wallboard surfaces. Transverse trowelling bars are mounted at the trailing edges of the right angle extending surfaces and give the proper crown effect to the mastic layer being applied to the tape and the adjacent wallboard surfaces. These bars are pivoted at the tool corner that rides on the inner corner of the tape. Side bars are pivoted to the sides of the two right angle extending surfaces at the points adjacent to the leading edges of these surfaces, and the trailing ends of the side bars are connected to the outer ends of the transversely extending trowelling bars.

The trowelling and side bars in the last-named patent are made to project over the right angle surfaces so as to provide space for receiving the mastic flowing from the grooves. The space between the right angle surfaces of the tool and the adjacent surfaces of the room corner over which the tool is moved, is sufficient in many instances for the mastic to build up to a volume where its weight will cause the mastic to drop clear of the tool and onto the floor. This has been overcome in the present tool by bringing the two right angle surfaces of the tool, closer to the wallboard surfaces during the use of the tool, so that mastic of less thickness will be applied and the weight of this mastic will be less than its tendency to adhere to the wallboard surfaces. A larger feed opening in the tool for mastic can be provided to deliver the mastic to the grooves and the force necessary to feed the mastic will be materially reduced, thus permitting manual pressure to be used for feeding the mastic to the tool head as is shown and claimed in my copending application, Serial No. 476,219.

The mastic-receiving grooves in the tool head of my Patent No. 2,594,606, are shallow and this makes the mastic thin. A thin layer of mastic, when contacting the tape and adjacent wallboard surfaces, will give up some of its moisture to both. This will thicken the consistency of the mastic and therefore greater force will be required to feed the mastic to the grooves. A pump must be used to move the mastic.

In the present invention, the grooves in the two surfaces that extend at right angles to each other are made gradually deeper as the outer ends of the grooves are reached. The amount of mastic in the grooves will be greater and therefore less of its mass will give up moisture to the tape and wallboard. The mastic will thus remain more flowable and less force will be needed to move the mastic into the grooves. A manually operated means can take the place of the pump for forcing the mastic to the tool head grooves and one such manually operated means is shown in my copending application, Serial No. 476,219.

Other objects and advantages will appear in the following specification, and the novel features of the device will be particularly pointed out in the appended claims.

My invention is illustrated in the accompanying drawings forming a part of this application in which:

Figure 1 is a top plan view of the corner-finishing tool head;

Figure 2 is a side elevation of Figure 1;

Figure 3 is a horizontal section taken along the line III—III of Figure 2;

Figure 4 is a transverse section taken along the line IV—IV of Figure 1;

Figure 5 is a transverse section taken along the line V—V of Figure 1;

Figure 6 is a bottom plan view of Figure 1;

Figure 7 is a diagrammatic view of the two layers of mastic enclosing the tape; and Figure 8 is a horizontal section taken along the line VIII—VIII of Figure 4.

While I have shown only the preferred form of my invention, it should be understood that various changes or modifications may be made within the scope of the appended claims without departing from the spirit and scope of the invention.

In carrying out my invention, I provide a corner tool head body A, which is preferably a casting, and this body has two wings $A^1$ and $A^2$, see Figure 3, that extend substantially at right angles to each other. In actual practice the two faces 1 of the wings make an angle which is slightly less than 90°. The wing $A^1$ is shown in Figure 2 and, since each wing is identical, a description of the wing $A^1$ will suffice for the other wing $A^2$. The face 1 of the wing $A^1$ has a mastic-receiving recess 2 formed therein. Figure 3 is a section along the recess 2, and it will be seen that this recess is relatively shallow in depth at $2a$, and then the depth of the recess is gradually increased as indicated at $2b$. The entrance or shallow portion $2a$ of the recess communicates with an opening 3 through which mastic may be delivered to the two recesses 2 and 2' in the wings $A^1$ and $A^2$.

I have shown in my Patent No. 2,594,606, the mastic-receiving grooves in the corner tool head as being shallow and of uniform depth throughout their length. This causes the layer of mastic received by the grooves to be thin. A part of the moisture in the mastic is absorbed by the tape, over which the mastic is applied, and by the adjacent portions of the wallboard surfaces. As soon as the mastic loses a part of its moisture, it becomes less pliable and it takes a greater force to move additional mastic into the grooves. In fact, the force is so great as to require a pump for delivering the mastic to the corner tool head.

I have found that by making the recesses 2 and 2' in the present tool head of the shape shown in Figure 3, a greater volume of mastic will be received in these grooves or recesses, and this mastic will have a gradually increasing depth as the outer ends of the grooves are approached. Any moisture that the mastic will give up to the tape and adjacent wallboard surfaces will not be sufficient to reduce the plasticity of the mastic to a point where a pump will be necessary to force the mastic into the grooves or recesses. In fact the manually operated mastic-feeding mechanism, shown in my copending application, Serial No. 476,219, can be used with the corner tool head disclosed in the present case.

The body A has a universal connection with a supporting device indicated generally at B, which may be a handle. This supporting device may be a conical nozzle, as indicated in Figure 1, that will feed mastic to the opening 3. The conical nozzle B is described and claimed in my copending application, Serial No. 476,219.

The conical nozzle B carries a spherical head $B^1$ and this head is received in a spherical recess 4 provided in the body A. The spherical head $B^1$ has a bore 5 therein through which the mastic flows to the opening 3 in the body A. It is possible for the corner tool head body A to have a universal connection with the conical nozzle B by means of the spherical head $B^1$.

A U-shaped spring clamp C has sides received in parallel grooves 6, provided in the body A, and the spring clamp frictionally engages with the outer surface of the spherical head $B^1$ at a point beyond the center of the head to hold the head in the spherical recess 4 while permitting a universal movement between the corner tool head and the conical nozzle B. The sides of the U-shaped spring clamp C will give slightly when it is desired to remove the spherical head from the recess 4.

Returning to the structure of the corner tool head, it will be seen from Figures 1 and 2 that I provide a corner clip or shoe which is in two parts. The upper clip part is shown at D, while the lower one is shown at $D^1$ in Figure 2. The upper clip D has inwardly extending flanges 7 and 8, see Figure 8, and the body A has grooves 9 for receiving these flanges, see Figures 2 and 4. The lower corner clip $D^1$ is likewise provided with flanges 10 and 11, see Figure 6, and these are received in grooves 12 provided in the body A, see Figure 2. The clips D and $D^1$ are preferably driven into place and remain a permanent part of the corner tool head and constitute a surface that rides against the tape when the tool is used for applying a finishing coat of mastic over the tape. The adjacent ends of the two clips D and $D^1$ are spaced from each other a distance equal to the diameter of the passage 3 so as not to interfere with the flow of mastic from the passage into the grooves 2 and 2'.

I will now describe the mechanism for determining the thickness of the second layer of mastic and for forming the proper curvature to the outer surface of this layer. In Figure 1, I show two trailing matrices E and F. In Figure 8, I illustrate these matrices E and F as being provided with bevelled inner ends 13 and 14 respectively. The matrix E has a notch 15 for receiving the flange 7 of the upper clip D, and the matrix F has a notch 16 for receiving the flange 8 of the same clip. The structure permits the two matrices E and F to fulcrum about the inner corner of the upper clip D, see Figure 8, and the flanges 7 and 8 prevent the two matrices from moving in the directions of their lengths toward their outer ends. Figure 4 shows how the matrix F is received in a groove 17, provided in the body A. The same groove receives the inner end of the matrix E, and this is clearly shown in Figure 1.

A trailing bar G is mounted in a groove 18 provided in the matrix E, see Figure 2. It will be noted that the groove 18 is inclined with respect to the horizontal sides of the matrix E so that the trailing bar G is nearer the top side 19 of the matrix E at the inner end of the matrix. The outer end of the trailing bar G is disposed near the opposite or lower side 20 of the matrix E at a point adjacent to the outer end of the matrix. The purpose of this construction is to provide the greatest amount of hinge effect to the matrix E at the point where the flange 7 enters the notch 15 in the matrix. The trailing bar G has its inner end extending up to a point 21 and this point coincides with the vertex line of the corner clips D and $D^1$. In Figure 2, I show a dot-dash line 22 that represents the inner corner of the tape over which the tool rides when the second layer of mastic is applied to the surface of the tape.

In Figure 2, I show a side matrix indicated generally at H and this matrix has its leading end rigidly connected to the outer end of the trailing matrix E so that the two will swing together as a unit. Figure 1 shows the side matrix H, provided with a groove 23, and in this groove I mount a side bar J. The bar is removably held in place by set screws 24. It will be noted that the bar J is placed near the inner edge 25 of the side matrix H and the purpose of this will be set forth hereinafter.

The trailing matrix F is likewise provided with a side matrix K, see Figure 1, and this corresponds to the side matrix H. I provide a side bar L for the side matrix K and this corresponds to the side bar J. The matrices F and K are rigidly connected together so as to swing as a unit.

Again referring to Figure 2, I show the leading end of the side matrix H supported by an arcuate member M. This member M is curved as shown in Figure 6 and has its inner end notched at 26 for receiving the flange 10 of the lower clip D¹. The matrices E and H and the arcuate member M form a swingable frame that pivots about the corner clips D and D¹ as a center.

It will also be noted from Figure 6 that I provide a second arcuate member N that has its outer end connected to the leading end of the side matrix K and has its inner end notched at 27 for receiving the flange 11 of the lower clip D¹. The matrices F and K and the arcuate member N form a second frame that is free to swing about the corner clips D and D¹ within predetermined limits.

The two swingable frames comprising the trailing matrices E and F, the side matrices H and K and the arcuate members M and N are yieldingly urged toward a wallboard inner corner by a leaf spring P, see Figure 1. This spring has its mid-portion received in a groove 29, and has its outer ends yieldingly bearing against the outer ends of the trailing matrices E and F. A retaining screw 28 is passed through the groove 29, and is placed in back of the leaf spring so as to hold the spring in the groove, see Figure 4. The leaf spring will ride within the space provided at the back of the body A and above the rearwardly extending projections 30 and 30' shown in Figures 1 and 3, these projections forming the walls of the recesses 2 and 2'.

The purpose for the leaf spring P, exerting its force against the outer ends of the matrices E and F, will be explained hereinafter. The spring will urge the trailing matrices E and F and the side matrices H and K toward wall board surfaces 31 and 32, see Figure 1, so that the trowelling bars G and G¹, as well as the side bars J and L, will be pressed against the wallboard surfaces. I provide limit stops in the shape of hooks 33 and 34 and these are placed in the backs of the side matrices H and K as clearly shown in Figure 6. The hooks will engage with the rear surface of the body A when the matrices have swung a predetermined distance in advance of the faces 1 of the wings A¹ and A².

In Figure 7 I show two wallboard sections Q and R that are arranged at right angles to each other to form an inner corner. A first layer of mastic S is shown applied to the inner corner and this is covered by the tape T. If excess mastic has been used in the first layer S, such mastic will be squeezed out from the sides of the tape when the corner roller device shown in my Patent No. 2,533,209 is moved along the tape to smooth it. The squeezed out mastic is indicated at S¹ and S² in Figure 7 and will remain clinging to the wallboard surfaces 31 and 32.

My device is adapted to make use of this excess mastic and is provided with mastic-receiving recesses 35 and 36, see Figures 2 and 6, and these recesses have scoop-shaped portions disposed at the leading edges 37 of the wings A¹ and A². It will be seen from Figure 2 that the recess 35 is substantially co-extensive with the width of the wing A¹. The same is true of the recess 36 which is substantially co-extensive with the wing A².

When now the tool is applied to the corner of the tape T, as indicated by the dot-dash line in Figure 4, and as shown by the dot-dash line 22 in Figure 2, the outer ends of the recesses 35 and 36 will extend beyond the side edges of the tape. A movement of the tool in a downward direction in Figures 2 and 4 will cause the scoop-shaped recesses 35 and 36 to scoop up the excess mastic shown at S¹ and S² in Figure 7. Continued movement of the tool will deliver this mastic from the recesses 35 and 36 and will deposit it over the tape T to form the second layer of mastic U, as shown in Figure 7. The recesses 35 and 36 have their walls shaped for this purpose. If there is sufficient excess mastic, it will be unnecessary to feed any new mastic into the grooves 2 and 2' by means of the passage 3 because the faces 1 of the wings A¹ and A² will be spaced a sufficient distance from the tape T and the wallboard surfaces 31 and 32 to permit the mastic to move from the recesses 35 and 36 into the grooves 2 and 2'. From this place the mastic will be applied to the exterior surface of the tape and to the outer surface of the wallboard to form a second layer of mastic U. The second layer will be given a crown-like effect as shown at 38 in Figure 7 by the trowelling bars. The arcuate members M and N are curved as shown in Figure 6, so as not to interfere with the scoop-shaped ends of the mastic-receiving recesses 35 and 36.

It is vital that as much pressure as possible be applied to the outer ends of the trowelling bars G and G¹, so that the edges of the second layer of mastic U will be feathered and will merge into the wallboard surfaces 31 and 32. For this reason the leaf spring P has its ends bearing against the outer ends of the matrices E and F. It is also vital that the mastic within the grooves 2 and 2', and the mastic still confined within the areas of the wing faces 1, apply as little pressure as possible to the surfaces of the trailing matrices E and F and the side matrices H and K, so that the leaf spring P will be able ot maintain the bars carried by these matrices in their proper relation with respect to the wallboard surfaces 31 and 32. It is for this reason that the trowelling blade G is arranged at an angle in the matrix E as shown in Figure 2. The outer end of the blade G is disposed close to the underside 20 of the matrix E, and the inner end is disposed nearer the top side 19. The inner end of the blade is placed near the top of the matrix E to provide sufficient length in the notch 15 for the flange 7 of the upper clip D to hold the matrix E in place. The side matrix H has its side bar J disposed close to the inner edge 25 of the matrix so that the mastic on the face 1 and on the wallboard will have less tendency to move the side matrix away from the wallboard surface. The result is that an operator can exert manual pressure for holding the tool against the tape and then can move the tool for applying the second layer of mastic U over the tape.

I have used carbide blades or bars in the present invention because they have a long life in resisting the abrasive effect of the mastic. Such blades are brittle and break easily and that is why I mount them in matrices for protection. A carbide blade has a much longer life than a high carbon steel blade. The trowelling blades G and G¹ fit into the grooves 18 and are held in place by set screws 18'. The inner ends of the blades are held by the two set screws and then the outer ends are flexed to give a crown effect to the blades whereupon the outer set screws 18a are fastened into place. The screws do not pass through the blades, but merely secure them in place.

The wallboard inner corners may vary slightly above 90° or slightly less. The faces 1 make an angle of slightly less than 90°. The trowelling blades are free to move with their matrices to contact the wallboard surfaces even though there might be slight irregularities in these surfaces.

The clips or shoes D and D¹ are preferably plated with iron carbide to give them a long-wearing carbide coating. In using the tool, the lower clip D¹ rides on the tape T and this need be the only one coated if desired. There is a tendency for the tool head to rock backwards slightly about the universal head as the tool is moved over the tape, and therefore the lower clip D¹ will be subject to more wear than the upper clip. Actually the tool head rides on the lower clip D¹ and on the outer corners of the trailing bars G and G¹ during use.

The faces 1 of the wings A¹ and A² form an angle of about 3° with the wallboard surfaces 31 and 32. This reduces the space for the mastic that is applied to the tape. Therefore the skin friction of the mastic on the tape and wallboard is such as to prevent any mastic from dropping from the tool head during its use. The passage 3 can be made larger for delivering a greater quantity of mastic to the grooves 2 and 2'. An enlargement of the passage reduces the force necessary to feed the mastic and therefore manually operated means, not shown, may be resorted to rather than using a pump. This has been pointed out in my copending application, Serial No. 476,219.

The side blades J and L are preferably spaced about three-thousandths of an inch below the trowelling blades G and G¹. The leaf spring P exerts about a six pound pressure on the outer ends of the matrices E and F, although I do not wish to be confined to any particular pressure. This causes the outer ends of the trowelling blades G and G¹ to bear against the wallboard surfaces with considerable force and assures a feather edge being formed on the second mastic layer with a minimum of exertion upon the part of the operator in holding the tool in place. The spring pressure on the outer end of the trowelling blades is assured by either curving the outer ends of the blades or disposing the side blades slightly below these outer ends as already stated.

The second layer of mastic U as it is being applied to the tape and wallboard surfaces by the tool, tends to adhere and remain stationary while the tool moves on. The side blades prevent the mastic from moving beyond the sides of the tool while the trowelling blades determine the thickness and the crown effect given to the layer. The trailing and side matrices offer a minimum of width on the inner surfaces bordered by the trowelling and side blades. Therefore the mastic in the tool as it is being applied to the tape and adjacent wallboard surfaces will have less tendency to lift the matrices away from these surfaces. The thin blades will cut through the mastic.

The U-shaped spring clip C will exert sufficient force to hold the tool head on the spherical knob in any position into which the tool head is swung while still permitting the head to be swung with respect to the nozzle B or handle, not shown, as the head is moved along the wallboard corner. Figure 3 illustrates the wiping action the inner edges of the side matrices have on the arcuate outer surfaces of the projections 30 and 30'. The mastic is prevented from squeezing between the side matrices and the side edges of the faces 1 and therefore the matrices will be free to swing at all times.

I claim:

1. In a corner-finishing tool head: a body having angularly-related faces providing a corner therebetween; the faces having leading, trailing and side edges; these faces being arrangeable in confronting relation with two wallboard taped surfaces that define a corner, with the corner of the faces disposed at the wallboard corner; means for delivering mastic to said faces for applying a layer of mastic to the surfaces; two transverse matrices extending along the trailing edges of the faces; a corner-shaped clip secured to the body corner and pivotally supporting the inner ends of the matrices; trowelling bars carried by the matrices; the inner ends of the bars being disposed close to the upper sides of the matrices to provide space for the pivotal connection between the matrices and clip, and the outer ends being disposed close to the lower sides of the matrices to reduce the area of the face of the matrices to the pressure of mastic; the trowelling bars projecting beyond the surfaces of the matrices for trowelling off any excess mastic as the tool head is advanced longitudinally along the wallboard corner; and yielding means for urging the trowelling bars toward the wall board surfaces.

2. The combination as set forth in claim 1: and in which two spaced-apart and longitudinally-extending side matrices are arranged along the side edges of the faces and have their trailing ends connected to the outer ends of the first-named matrices; and side bars carried by the side matrices and being disposed closer to the inner sides of the matrices than the outer sides so as to reduce the area of the side matrices subjected to the pressure of mastic that overlies the faces.

3. In a corner-finishing head: a body having a pair of angularly-related faces providing a corner therebetween and having trailing edges, side edges, and leading edges; the faces being arrangeable in confronting relation with two wallboard taped surfaces that define a corner, with the corner of the faces disposed at the wallboard corner; the faces having grooves that extend substantially across the widths of the faces and having mastic-receiving recesses that have entrances at the leading edges for scooping up any excess mastic on the tape or wallboard surfaces; the recesses feeding the mastic into the grooves as the head is moved, and the grooves in turn applying a layer of mastic to the surfaces; two transverse matrices with grooves therein, said matrices extending from the corner of the body and along the trailing edges and being pivotally supported at the body corner; bars received in the grooves of the matrices and projecting beyond the surfaces of the matrices for trowelling off any excess mastic as the tool head is advanced; two spaced-apart and longitudinally extending side matrices with grooves therein, said side matrices being arranged along the side edges of the faces and paralleling the body corner and having their trailing ends connected to the outer ends of the transverse matrices and being swingable therewith; side bars placed in the grooves in the side matrices and projecting beyond the surfaces thereof to limit the lateral spreading of the mastic; and two transversely extending arcuate members bordering the leading edges and clearing the entrances to the mastic-receiving recesses, said arcuate members having their outer ends operatively connected to the leading edges of the side bars and their inner ends pivotally connected to the corner of the body so as to swing with the trowelling and side bars; and yielding means for urging the trowelling and side matrices and arcuate members toward the wallboard surfaces.

4. The combination as set forth in claim 3; and in which means is provided for feeding additional mastic to the grooves in the faces should insufficient mastic be fed to the grooves from the mastic-receiving recesses.

5. In a corner-finishing head: a body having a pair of angularly-related faces providing a corner therebetween and having trailing edges and side edges; these faces being arrangeable in confronting relation with two wallboard taped surfaces that define a corner, with the corner of the faces disposed at the wallboard corner; means for delivering mastic to said faces for applying a layer of mastic to the surfaces; two transverse matrices extending from the corner of the body and along the trailing edges of the faces; means for pivotally supporting the matrices at the corner of the body; said matrices having trowelling bar-receiving grooves therein; trowelling bars carried by the matrices and being received in the grooves and projecting beyond the surfaces of the matrices for trowelling off any excess mastic as the tool head is advanced longitudinally along the wallboard corner; two spaced-apart and longitudinally-extending side matrices arranged along the side edges of the faces and paralleling the body corner; said side matrices having their trailing ends connected to the outer ends of the transverse matrices and being swingable therewith; said side matrices having side bar-receiving grooves therein; side bars carried by the side matrices and being received in the grooves thereof and projecting beyond the surfaces of the side matrices to limit the lateral spreading of the mastic; yielding means for urging the transverse and side matrices toward the wallboard surfaces; the two angularly-related faces having leading edges; and two transversely-extending arcuate members bordering the leading edges and having their outer ends connected to the leading ends of the side matrices and having their inner ends pivotally supported at the corner of the body; whereby each body face will be bounded on three sides by a swingable member composed of the transverse and side matrices and the arcuate member of that side.

6. In a corner-finishing tool head: a body having angularly-related faces providing a corner therebetween; the faces having trailing edges and grooves that extend substantially across the widths of the faces with the depths of the grooves gradually increasing from the corner to the outer ends of the grooves; means for delivering mastic to the grooves; the faces being arrangeable in confronting relation with two wallboards that define a corner, with the corner of the body disposed at the corner of the boards; the grooves transferring mastic to the wallboard corner; two mastic trowelling bars extending from the body corner and lying adjacent to the trailing edges of the faces for trowelling off excess mastic as the body is advanced along the wallboard corner; yielding means for urging the trowelling bars toward the wallboard surfaces; the faces having side edges; side bars extending along the side edges and being connected to the trowelling bars so as to move therewith; the side bars contacting the wallboard surfaces; the faces having leading edges; and two transversely-extending arcuate members bordering the leading edges and having their outer ends operatively connected to the leading edges of the side bars and their inner ends pivotally connected to the corner of the body.

References Cited in the file of this patent

UNITED STATES PATENTS

| | | |
|---|---|---|
| 2,594,606 | Ames | Apr. 29, 1952 |
| 2,666,323 | Ames | Jan. 19, 1954 |